US 7,890,477 B2

(12) United States Patent
Cox et al.

(10) Patent No.: US 7,890,477 B2
(45) Date of Patent: Feb. 15, 2011

(54) SYSTEMS AND METHODS FOR PROVIDING DIGITAL CONTENT

(75) Inventors: Gerald L. Cox, Deephaven, MN (US); Brian Geurts, St. Paul, MN (US)

(73) Assignee: Total Training Network, Inc., Minneapolis, MN (US)

( * ) Notice: Subject to any disclaimer, the term of this patent is extended or adjusted under 35 U.S.C. 154(b) by 838 days.

(21) Appl. No.: 10/923,498

(22) Filed: Aug. 20, 2004

(65) Prior Publication Data

US 2005/0076061 A1 Apr. 7, 2005

Related U.S. Application Data

(60) Provisional application No. 60/496,955, filed on Aug. 20, 2003.

(51) Int. Cl.
*G06F 7/00* (2006.01)
(52) U.S. Cl. .................................. 707/694; 707/782
(58) Field of Classification Search .......... 707/1–104.1, 707/787, 694
See application file for complete search history.

(56) References Cited

U.S. PATENT DOCUMENTS

| 5,631,974 | A | * | 5/1997 | Lau-Kee et al. ............. 382/132 |
| 5,832,510 | A | * | 11/1998 | Ito et al. ...................... 707/201 |
| 5,878,408 | A | * | 3/1999 | Van Huben et al. ............. 707/1 |
| 5,881,229 | A | * | 3/1999 | Singh et al. .................. 709/203 |
| 6,088,693 | A | * | 7/2000 | Van Huben et al. ............. 707/8 |
| 6,532,459 | B1 | * | 3/2003 | Berson .......................... 707/3 |
| 6,826,692 | B1 | * | 11/2004 | White .......................... 726/8 |
| 6,868,403 | B1 | * | 3/2005 | Wiser et al. ................... 705/51 |
| 7,108,605 | B2 | * | 9/2006 | LeMay et al. ................. 463/43 |
| 7,139,811 | B2 | * | 11/2006 | Lev Ran et al. ............. 709/217 |
| 7,181,017 | B1 | * | 2/2007 | Nagel et al. .................. 380/282 |
| 7,181,438 | B1 | * | 2/2007 | Szabo .......................... 707/2 |
| 7,284,271 | B2 | * | 10/2007 | Lucovsky et al. ............. 726/21 |
| 2002/0178271 | A1 | * | 11/2002 | Graham et al. .............. 709/229 |
| 2003/0147629 | A1 | * | 8/2003 | Kikuchi et al. ................ 386/69 |
| 2003/0212805 | A1 | * | 11/2003 | Motosaka et al. ........... 709/228 |
| 2003/0220985 | A1 | * | 11/2003 | Kawamoto et al. .......... 709/219 |
| 2004/0098663 | A1 | * | 5/2004 | Rey et al. .................... 715/500 |
| 2004/0107123 | A1 | * | 6/2004 | Haffner et al. ................. 705/7 |

* cited by examiner

*Primary Examiner*—James Trujillo
*Assistant Examiner*—Linh Black
(74) *Attorney, Agent, or Firm*—Moss & Barnett

(57) ABSTRACT

Systems, methods, and apparatus store and play licensed digital content in a plurality of files on a computer-readable medium. In addition, a plurality of dummy files are also stored on the computer-readable medium. The file names for the licensed digital content files and the dummy files are generated in a manner such that the licensed digital content files cannot be distinguished from the dummy files. The file names may comprise randomly generated characters, or sequential file names where the sequential file names are randomly assigned to the digital content files and the dummy files.

24 Claims, 3 Drawing Sheets

SYSTEMS AND METHODS FOR PROVIDING DIGITAL CONTENT

RELATED FILES

This application claims the benefit of U.S. Application Ser. No. 60/496,955, filed Aug. 20, 2003, entitled "SYSTEMS AND METHODS FOR PROVIDING DIGITAL CONTENT" which is hereby incorporated herein by reference for all purposes.

FIELD

The present invention relates generally to providing digital content in computer systems, and more particularly to providing digital content to authorized users of computer-readable media.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright ©2003, Total Training Network, Inc. All Rights Reserved.

BACKGROUND

Computerized systems are commonly used to deliver digital content, such as audio, video, graphical and textual presentations. Many different types of presentations are possible. One example of such presentations are training or educational presentations.

Various methods may be used to deliver digital content. Some systems deliver content over networks. In these systems, a server typically stores the content and a client system connects over a network to the server and requests that the content be downloaded to the client. The content can then be presented on the client system, either after the download is completed or as the content is being downloaded (e.g. streaming media based systems). Downloading content over a network provides a convenient way to provide on-demand presentations, however for large presentations, and in particular for multi-media presentations, the amount of data to be transferred typically requires a high-speed network connection in order for the presentation to be played satisfactorily. Additionally, the client system may need to be connected to a corporate LAN or intranet in order to access the content. This is not always possible or convenient for employees that travel frequently (e.g. sales representatives) that desire access to the digital content.

Digital content may also be distributed on computer-readable media, such as CD-ROM, DVD-ROM, memory sticks, USB flash drives and the like. Distributing content using computer-readable media has the advantage the a high speed network connection is not required in order to utilize the content, and large presentations may be distributed on computer-readable media that have adequate storage capacity. However, there are also significant disadvantages. A first disadvantage is that the media may be lost or stolen. Replacing lost or stolen media may be costly, and in fact may equal the original purchase price for the content.

A further disadvantage is that computer-readable media may typically be easily copied and redistributed without the content provider's knowledge or compensation. While several mechanisms have been developed to deal with this problem, including digital rights management software and encryption mechanisms, such mechanisms typically require special software to be installed on the user's computer, and can also decrease the performance of a computer system due to the increased overhead involved in decrypting the content.

In view of the above-mentioned issues, there is a need in the art for the inventive subject matter described below.

SUMMARY

The above-mentioned shortcomings, disadvantages and problems are addressed by the present invention, which will be understood by reading and studying the following specification.

One aspect of the inventive subject matter includes storing licensed digital content in a plurality of files on a computer-readable medium. In addition, a plurality of dummy files are also stored on the computer-readable medium. The file names for the licensed digital content files and the dummy files are generated in a manner such that the licensed digital content files cannot be distinguished from the dummy files. The file names may comprise randomly generated characters, or sequential file names where the sequential file names are randomly assigned to the digital content files and the dummy files.

A further aspect of the inventive subject matter includes a server capable of transmitting a user interface screen to a remote computer. The user interface includes one or more titles for a set of digital content to be presented to a user. The server receives a selection of one of the titles, and maps the title to a digital content file having a name assigned as described above. The server then transmits a command to the remote computer that invokes a player for the digital content, passing the mapped file name to the player.

The present invention describes systems, clients, servers, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

Operating Environment

Figure 1:
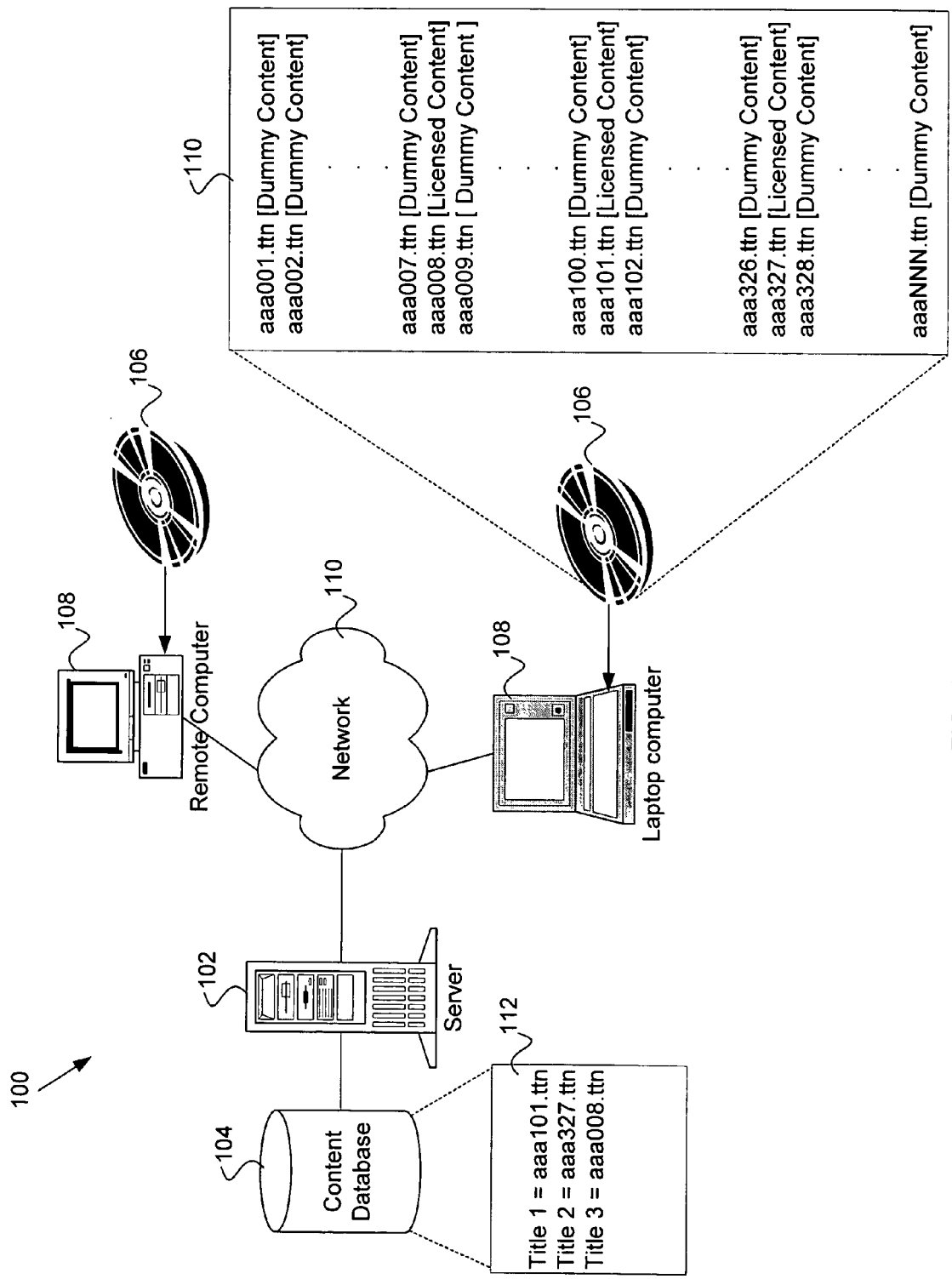
FIG. 1 is a block diagram of a hardware and operating environment in which different embodiments of the invention can be practiced.

FIG. 1 is a block diagram of a hardware and operating environment 100 in which different embodiments of the invention can be practiced. In some embodiments, operating environment includes a server 102 coupled to a database 104. Server 102 may be communicably coupled to remote computers 108 through a network 110. In some embodiments of the invention, network 110 is the Internet. However, any network may be used, including intranets and corporate networks.

Removable media 106 comprises a computer-readable media such as a CD-ROM, DVD-ROM, flash memory, USB attached flash drives, or other type of removable media that may be removably inserted or coupled to a computer such as remote computer 108. In some embodiments of the invention, removable media 106 has stored thereon a number of files 1 10, where each of the files is named in such a way that the content of the file is not apparent. For example, the file names may comprise randomly generated sequences of numbers and/or letters or sequential names such as "aaa0001.ttn", "aaa0002.ttn", "aaa0003.ttn" etc. The invention is not limited to any particular naming convention, all that is required is that the content of the file not be readily discernable from the name of the file.

Additionally, in some embodiments, the file type may also be randomly assigned or generated, or it may be assigned a file type that is not generally associated with a known file type. For example, known file types are those that commonly invoke a default application. For example, a ".doc" file type typically invokes a word processor, a ".pdf" file type typically invokes an Adobe Acrobat reader, a ".mp3" file type typically invokes an audio player etc. In some embodiments, a file type of ".ttn" is used, which is not generally associated with any known content player or viewer.

Further, in some embodiments of the invention, the files may be randomly distributed in a directory hierarchy. The directory hierarchy may be randomly generated, and also consist of names generated as discussed above with respect to file names.

In some embodiments, a certain number of the files 110 on media 106 have a format of a known and typically widely distributed media player. For example, the files may conform to the format of a multimedia file such as a ".avi" file, or a ".mpg" file. Alternatively, the file format may conform to a presentation such as a slide show or text document. Still further, the file may conform to an audio presentation such as a ".wav" or ".mp3" type file. These files will be referred to as licensed content files. The term "licensed" is used in this specification to refer to the fact that permission or authorization is required in order to legitimately access the content in the file. As noted above, even though the file may conform to a specific well known format, the file type in some embodiments will be different than that commonly or conventionally used for the format.

Further, media 106 will contain a certain number of files that contain random content, irrelevant content, or no content at all. These files will be referred to as dummy files.

In some embodiments, the licensed content files and the dummy files are randomly assigned file names as indicated above, and are interspersed with one another in the directory or directories on the removable media. In some embodiments, there are many more dummy files than licensed content files. As a result, an unauthorized user that browses the media and attempts to open a file will typically either be unable to do so because no player is associated with the file type, or will receive random or no content whatsoever. Even if a user is able to somehow play a licensed content file, the file will typically be played out of order relative to other licensed content files and thus be of little or no use to the unauthorized user.

It should be noted that removable media 106 may be part of a set of multiple removable media containing large amounts of licensed content, with each individual media having some sort of identifying matter placed on it.

Server 102 is typically a web server capable of displaying one or more web pages to browser clients that may be executed on a remote computer 108. In some embodiments, server 102 maintains a database 104 containing information about the content files residing on removable media 106. This information includes a mapping 112 from a title (or other label) for the content of the file to the file name on the removable media 106.

Additionally database 104 may contain information about parties that subscribe to the digital content in the files on removable media 106, or users authorized to view content on media 106. Database 104 may also contain information regarding courses that have been assigned to particular users by administrators of the system. Additionally, database 104 may contain information regarding a hierarchy within a subscribing company or entity. For example, the database may contain department level information such that a person designated as a manager for the department can assign courses to users within the department and view data related to users within the department, but cannot view data related to users outside of their department.

Users on remote computers 108 typically connect to server 102 through a network connection 112 to network 110. In some embodiments, network connection 112 may be a dialup connection or other comparatively slow speed connection. However, the invention is not limited to any particular type of connection between remote computers 108 and server 102.

Figure 2:
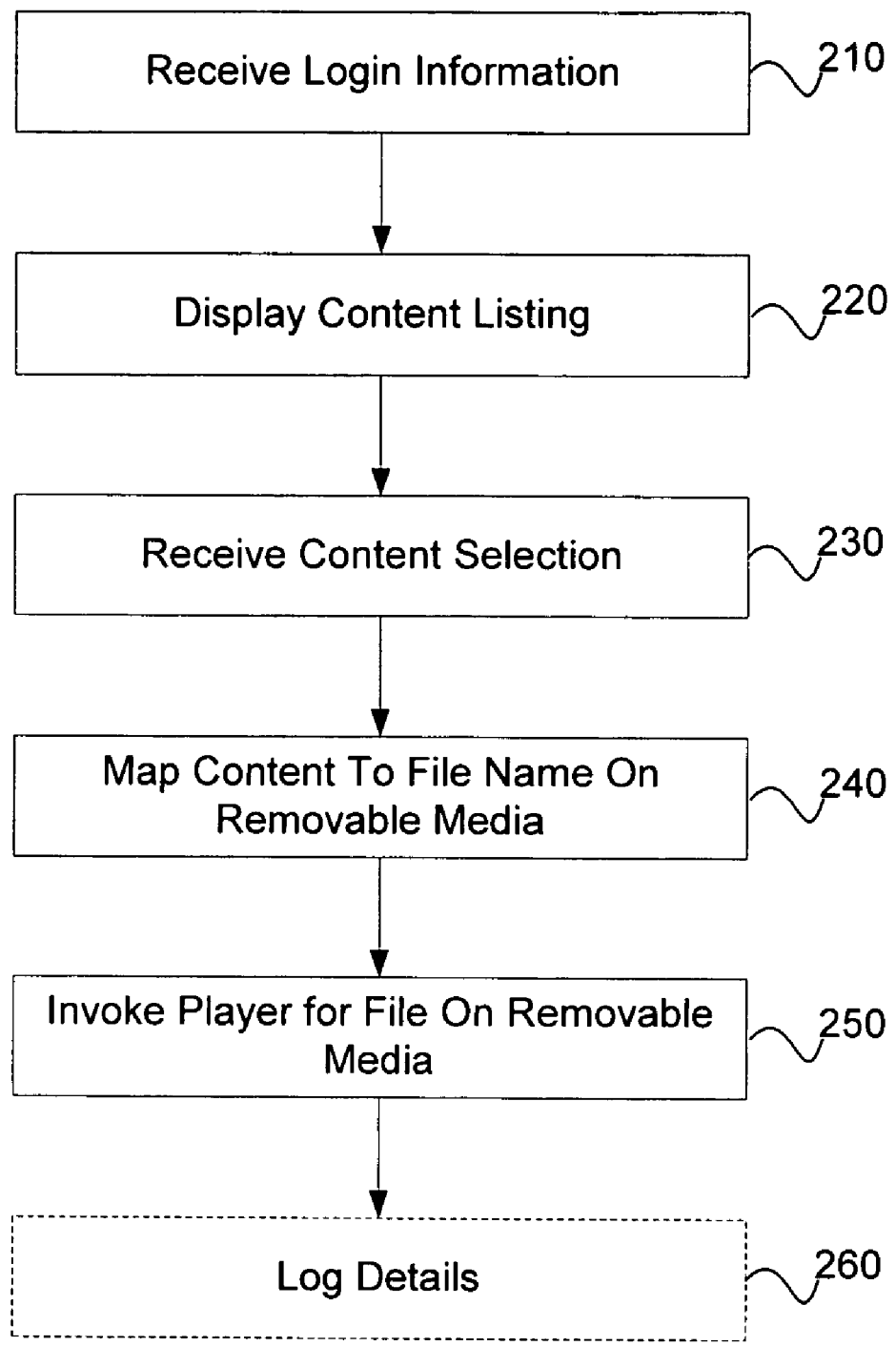
FIG. 2 is a flowchart illustrating a method according to an embodiment of the invention.

FIG. 2 is a flowchart illustrating methods for providing licensed content to a remote user according to an embodiment of the invention, and may operate in the environment described above. The methods to be performed by the operating environment constitute computer programs made up of computer-executable instructions. Describing the methods by reference to a flowchart enables one skilled in the art to develop such programs including such instructions to carry out the methods on suitable computers (the processor or processors of the computer executing the instructions from computer-readable media). The methods illustrated in FIG. 2 are inclusive of acts that may be taken by an operating environment executing an exemplary embodiment of the invention.

The method begins when a user on a remote system logs in to server 102, and server 102 receives the login information (block 210). In some embodiments, a combination of username and password are required to successfully login.

Next, the titles (or labels) of content that the user is permitted to access is displayed to the user (block 220). In some embodiments the titles are displayed on a web page. In some embodiments, the content is personalized to the user based on information in a database. For example, titles of content comprising management training may be provided to company managers while titles for content comprising sales training may be provided to company sails personnel. Typically the content will be content that the user or the user's employer has purchased from a content supplier. In some embodiments, the content may be training courses. Different content may be supplied to different parties on media 106. The content that a user is allowed to view is typically maintained in a database such as database 104.

The user then selects a desired content title (or other label), which is received by the server (block 230). The selection may be made from a link on a web page as described below, or from a menu selection provided on a user interface. The invention is not limited to any particular manner of selecting content.

Additionally, a user can browse for permitted content. For example, a user may browse by subject, curricula, or faculty providing a course. For example, on the exemplary user interface, clicking on the link entitled "Sales Management" would cause a list of all courses for which the subject was related to sales management, and for which the user was permitted to view to be displayed.

The system maps a selected content title to the file name of a licensed content file on media 106 (block 240). In some embodiments of the invention, the mapping is maintained in database 104.

Next, the server causes a player to be invoked for the licensed content file, passing the mapped file name to the player (block 250). Methods of invoking a player based on the selection of a link on a web page are known in the art. The player is executed on the remote computer and the licensed content begins to play from computer-readable media inserted or otherwise coupled to the remote computer. The player that will be executed is appropriate to the format of the licensed content file. For example, if the format of the licensed content file conforms to the mpg format, then a Windows Media Player may be executed. Similarly, if the format of the licensed content file conforms to a .ppt file format, the a Windows PowerPoint executable may be executed.

If the file cannot be found on the media, or if the wrong media is detected, the user may be prompted to insert a different media. The prompt may contain a media identifier to aid the user in locating the correct media (e.g. a disc number or title).

Finally, in some embodiments, details on the selection of a particular content are logged in a database such as database 104 (block 260). This allows a user to see what content has already been reviewed, and also allows management personnel to determine which courses their employees have viewed. The data may also be used to determine the popularity of courses.

Figure 3:
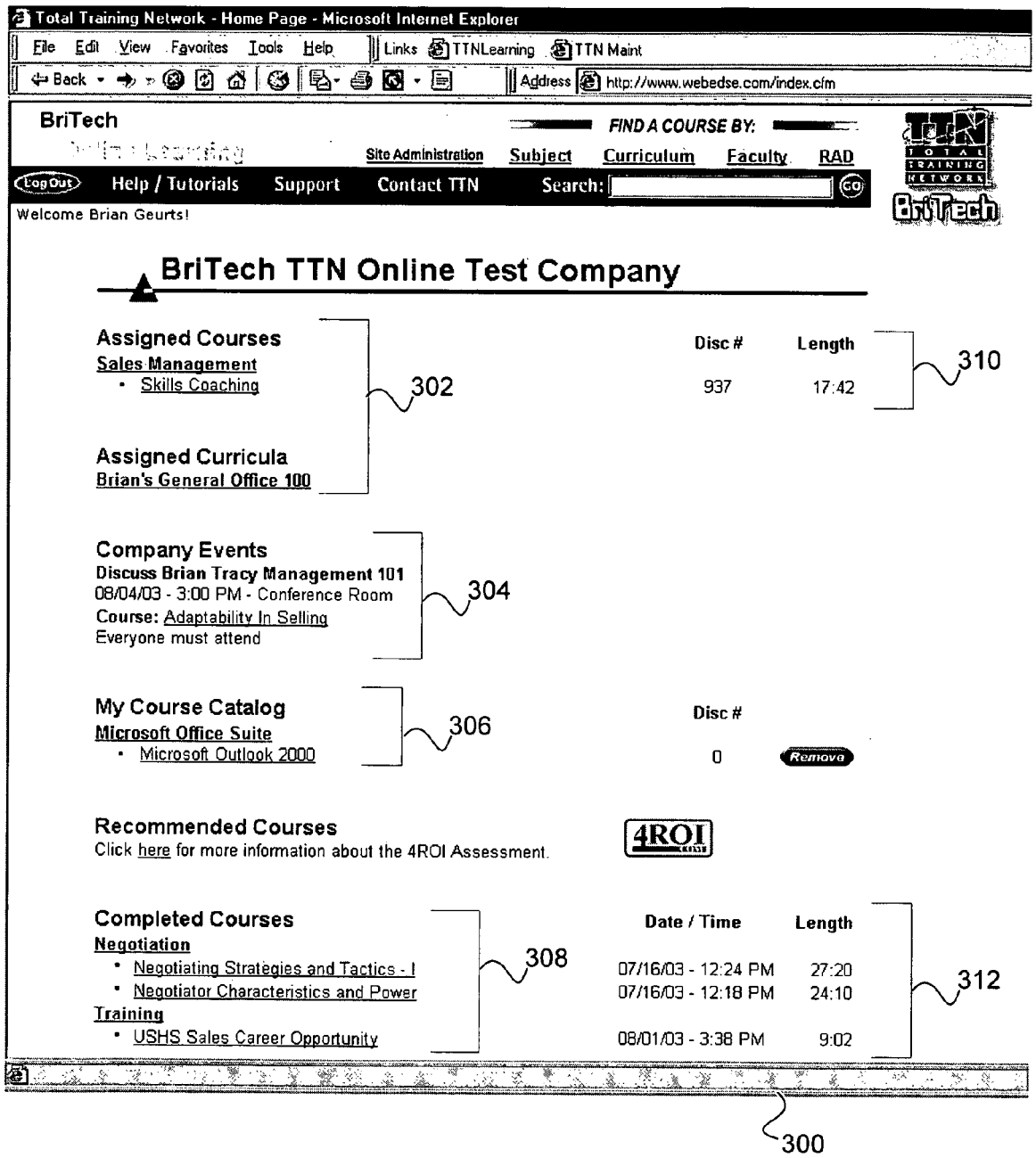
FIG. 3 is a diagram illustrating an exemplary graphical user interface provided by an embodiment of the invention.

FIG. 3 illustrates an exemplary user interface 300 used in some embodiments of the invention. The exemplary user interface shown in FIG. 3 may be displayed to a user upon successful login to a content server such as server 102. Various components are shown in FIG. 3, no embodiment of the invention is limited to the particular combination or format illustrated in FIG. 3. In some embodiments, user interface 300 includes assigned courses 302, assigned course time 312, events 304, course catalog 306, completed course listing 308, and completed course data 310.

Assigned course 302 comprises a listing of courses that have been assigned to the user. The assigned courses may have been assigned by the user's supervisor or other entity. Course data 312 may display information such as an identifier for a removable media containing the licensed content for the course, and the running time of the course.

Company events 304 comprises a listing of upcoming company events. Typically the event will be streamed from a server, although the event data may be on removable media 106 that the user is to view at a particular time.

Course catalog 306 comprises content that the user is allowed to view, but that is not necessarily required or assigned to view. Typically this content is content that the user may be interested in, and is permitted but not required to view.

Completed courses 308 comprises courses that the user has viewed in the past. Course data 310 includes data that may be read from a database indicating the date and time the user viewed the course. In addition, the running time for the course may be displayed in some embodiments of the invention.

CONCLUSION

Systems and methods for providing digital content to a remote user have been disclosed. The systems and methods described provide advantages over previous systems. For example, if the removable media containing licensed content is lost or stolen, it is unlikely that the finder or thief will be able to make use of the media. As a result, the replacement cost of the media is typically the cost of the media itself rather the content on the media.

Additionally, the systems and methods provide a way for a remote user to view licensed content without requiring a high speed network connection as is the case with systems that stream content from a server. The media itself may be placed on the user's own computer. The only network bandwidth consumed is that necessary for selecting from a user interface. A low speed network connection is sufficient for this type of activity.

Also, the systems and methods of the present invention are advantageous because no additional software beyond that normally found or generally available for a user's computer is typically required. For example, no special decryption or keying software is required in order to use the system. The systems and methods of the present invention provide a reasonable balance between absolute security and ease of use.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A computerized system for providing non-confidential digital content to authenticated users comprising:
   a computer-readable removable medium in the possession of an authenticated user, the removable medium containing a plurality of computer readable licensed content files and a dummy files interspersed on the medium, said computer readable licensed content files and dummy content files each having a file name that disguises the file type or content so that the content and dummy files cannot be distinguished by the file names;
   an authenticated user computer directly engaged with the computer-readable medium to retrieve the readable licensed content files;
   a server remotely connected to and in communication with the authenticated user computer over a network, operable to maintain a database mapping a content title with the plurality of readable licensed content files contained on the computer-readable medium, and further operable to maintain a database of authorized users;
   wherein the server performs the tasks of:
      receive user indentifying information from the authenticated user computer;
      authenticate the user as a proper party to receive content mapping information;
      receive a selection of a content title from the authenticated user computer;
      map the content title to at least one associated licensed content file; and
      issue a command to the authenticated user computer identifying the associated readable licensed content file contained on the computer-readable medium and invoking a player on the authenticated user computer for the associated readable licensed content file to be played on the remotely connected authenticated user computer.

2. The system of claim 1, wherein the licensed content files and the dummy content files are stored across a plurality of directories, said directories named in a manner such that the licensed content files and the dummy content files cannot be distinguished by the directory name.

3. The system of claim 1, wherein the licensed content file names and the dummy content file names comprise randomly generated characters.

4. The system of claim 1, wherein the licensed content file names and the dummy content file names comprise sequentially generated file names.

5. The system of claim 4, wherein the licensed content file names are randomly selected from the sequentially generated file names.

6. A method of retrieving non-confidential computer readable medium comprising:
   providing a removable computer-readable medium to an authenticated user;
   storing on the computer-readable medium a plurality of computer readable licensed content files;
   each of said licensed content files having a file name; and
   storing on the computer-readable medium a plurality of dummy content files, each of said dummy content files having a file name;
   wherein the file names are disguised such that the licensed content files and the dummy content files cannot be distinguished by the file names;
   providing a computer to the authenticated user to directly read the computer-readable medium;
   remotely connecting the computer over a network to a server for communication with the server, said server having a database mapping a content title with one or more licensed content files contained on the computer-readable medium, and further operable to maintain a database of authorized users;
   wherein the server performs the tasks of:
      receiving user indentifying information from the authenticated user computer;
      authenticating the user as a proper party to receive content mapping information;
      receiving a selection of a content title from the remotely connected computer;
      mapping the content title to at least one associated licensed content file on the computer-readable medium; and
      issuing a command to the remotely connected computer identifying the associated licensed content file and invoking a player for the associated licensed content file on the authenticated user computer to play the associated licensed content file.

7. The method of claim 6, wherein the licensed content files and the dummy content files are stored across a plurality of directories, said directories named in a manner such that the licensed content files and the dummy content files cannot be distinguished by the directory name.

8. The method of claim 6, wherein the licensed content file names and the dummy content file names comprise randomly generated characters.

9. The method of claim 6, wherein the licensed content file names and the dummy content file names comprise sequentially generated file names.

10. The method of claim 9, wherein the licensed content file names are randomly selected from the sequentially generated file names.

11. A computer-readable CD or DVD in the possession of an authenticated user, the CD or DVD having non-confidential licensed training program files and computer executable instructions for performing a method of playing selected licensed training program files, the method comprising:
   receiving a selection on a server over a network from a remotely connected authenticated user computer in direct communication with the CD or DVD of a selected licensed training program file of a plurality of licensed training program files stored on the CD or DVD with a plurality of dummy content files also stored on the CD or DVD; each of said licensed training program files and dummy content files having a file name, wherein the file names are disguised such that the licensed training program files or types and the dummy content files or types cannot be distinguished by the file names mapping from data stored on the server the training program files to a file name for the training program content; and issuing from the server to the remote authenticated user computer a command to invoke a player on the authenticated user computer for the selected licensed training program file, said command including the file name for the licensed training program file.

12. The computer-readable medium of claim 11, wherein the method further comprises:

receiving an authenticated user identification and password from the remote computer to validate the authenticated user's authority to access licensed training programs; and displaying the content title on the remote computer.

13. The computer-readable medium of claim 11, wherein the licensed content file names and the dummy content file names comprise randomly generated characters.

14. The computer-readable medium of claim 11, wherein the licensed content file names and the dummy content file names comprise sequentially generated file names.

15. The computer-readable medium of claim 14, wherein the licensed content file names are randomly selected from the sequentially generated file names.

16. The computerized system of claim 1 wherein the media is a CD or DVD.

17. The computerized system of claim 1 wherein the server first performs the task of receiving a proper login from the authenticated user computer to validate the user's authority to use the content on the medium.

18. The computerized system of claim 1 wherein the computer-readable medium is a CD or DVD and the content files are training programs that the server maps to file names on the CD or DVD.

19. The method of retrieving computer readable medium of claim 6 wherein the media is a CD or DVD.

20. The method of retrieving computer readable medium of claim 6 wherein the server first performs the task of receiving a user identification and password from the authenticated user computer to validate the user's authority to use the content on the medium.

21. The method of retrieving computer readable medium of claim 6 wherein the computer-readable medium is a CD or DVD and the content files are training programs that the server maps to file names on the CD or DVD.

22. The computerized system of claim 1 wherein details on the selection of particular content are logged in a database to create a viewable record of what content has been reviewed or not reviewed.

23. The computerized system of claim 1 wherein details on the selection of particular content are logged in a database to determine the popularity of various content.

24. The computerized system of claim 1 wherein the server contains a database of assigned courses, assigned course times, events, course catalogs, completed course listings or completed course data.

\* \* \* \* \*